US006983218B2

(12) United States Patent
Ruiz et al.

(10) Patent No.: US 6,983,218 B2
(45) Date of Patent: Jan. 3, 2006

(54) MEDIA SKEW COMPENSATION IN PRINTER DEVICE

(75) Inventors: Pascal Ruiz, Barcelona (ES); David Toussaint, Barcelona (ES); Marc Serra, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/687,843

(22) Filed: Oct. 20, 2003

(65) Prior Publication Data

US 2004/0130708 A1 Jul. 8, 2004

(30) Foreign Application Priority Data

Oct. 23, 2002 (EP) ........................................... 02023824

(51) Int. Cl.
*G01B 1/00* (2006.01)

(52) U.S. Cl. ...................................................... 702/151

(58) Field of Classification Search ................ 702/151; 347/19, 218, 54, 197, 220; 350/559; 400/611, 400/248, 17, 689, 636; 250/231
See application file for complete search history.

(56) References Cited

U.S. PATENT DOCUMENTS 4,387,380 A * 6/1983 Asakura et al. ............ 347/197
5,227,246 A * 7/1993 Ueda et al. .............. 428/32.61
6,478,401 B1 * 11/2002 King et al. .................. 347/19

FOREIGN PATENT DOCUMENTS

EP 1 176 802 1/2002

* cited by examiner

*Primary Examiner*—Michael Nghiem
*Assistant Examiner*—Tung S. Lau
(74) *Attorney, Agent, or Firm*—Foley & Lardner LLP

(57) ABSTRACT

A method of determining an angle between a first direction of movement of a print head and a second direction of movement of a print media, comprises: printing an array of markings on said print media, said array of markings extending along said first direction and along said second direction; traversing a sensor device along said first direction, and detecting a signal corresponding to said plurality of markings; identifying a plurality of peaks in said sensor signal as a plurality of data co-ordinates; and obtaining an angle data describing an angle between said plurality of data co-ordinates and a reference data.

14 Claims, 16 Drawing Sheets

MEDIA SKEW COMPENSATION IN PRINTER DEVICE

FIELD OF THE INVENTION

The present invention relates to the field of printing, and particularly, although not exclusively, to a method of correcting for alignment of a print head relative to a print media.

BACKGROUND OF THE INVENTION

Referring to FIG. 1 herein, conventional inkjet printer devices, especially of the type for printing on B size media format, or of the large format type, comprise a media transport mechanism 100 for carrying a sheet of print media 101, the media transport mechanism comprising a set of rollers, a set of control motors for controlling the rollers, and a set of guides for guiding the media, and a print head carriage 103. The carriage comprises a print head having a plurality of inkjet nozzles. Typically, the carriage traverses across the print media in a direction transverse to a direction of movement of the print media through the print mechanism.

With current inkjet printer technology, pen variability can lead to variations in print quality. To achieve a successful print quality, pen variability needs to be compensated for. Calibration in order to compensate for pen variability is known as the automatic alignment process. One of the purposes of the automatic alignment process is to rectify the angle of misalignment which can occur between an image printed onto a print media, and the boundaries of a print media. This angle is know as theta zeta, and is introduced by defects in the printing system, comprising the pen, carriage and print media. The objective is to assure that the drops of ink deposited by a print head onto a media are placed onto a perfect straight and vertical line.

A basic assumption is made that the inkjet nozzles are correctly aligned on the pen. The main defects in the printing system arise from defects in positioning between the pen, the carriage which carries the pen, and the print media. The inkjet nozzles naturally print on a straight line which is nominally vertical. An object of calibration is to make the straight line vertical with respect to the print media. Therefore, the angle between a nominally vertical line printed by the pen and a main vertical axis of the paper needs to be measured.

As a prior art calibration process, estimation of the angle theta zeta consists of printing a set of patterns onto a print media, and then scanning them, and applying an algorithm to compare the actual geometry of the pattern with a theoretical geometry of the pattern. The differences between the theoretical positions of the pattern and the scanned positions of the pattern are characteristic of the defects in alignment which are to be corrected.

Each group of nozzles prints a line of squares. A first line of squares is printed by an upper part of the pen, and so on down to a lower part of the pen. The pattern is scanned in line by line. By locating all the squares produced by a pen, the angle of the pen relative to the paper axis can be calculated.

Referring to FIG. 2. Herein, there is illustrated schematically a printed pattern comprising an array of squares, which is printed by a pen, and then scanned back in to the printer device.

An algorithm is applied in order to determine the angle of the pen relative to the main axis of the print media.

However, several constraints make the performance of this algorithm poorer than the performance which could be expected. One of the constraints is the skew in the paper introduced when the media advances between consecutive scans of the pen across the print media. In fact, what is actually measured with the algorithm is the angle between a nominal 'vertical' line as printed by the pen during the print phase, and the movement performed by the media during the scan phase. To properly determine the angle of misalignment, theta zeta, there needs to be determined how many degrees are due to the skew of the print media, and how many degrees are due to the defect which is to be corrected. Therefore, the amount of skew needs to be measured.

Referring to FIG. 3 herein, there is illustrated schematically a rectangular sheet of media 300 having an image 301 printed thereon. In a printer device in which the pens and carriage are perfectly aligned, relative to the transport mechanism for the media, the image can still be slightly skewed relative to the print media, due to misalignment of the print media within the media transport mechanism. An angle between a main length axis of the image and main length axis of the print media is know as the 'skew angle' and is illustrated schematically in FIG. 3. The skew angle could equally be defined as an angle between a main width axis of the printed image and a main width axis of the print media.

Referring to FIG. 4. herein, there is illustrated schematically a pattern of squares printed onto a print media. A currently known method for measuring skew is to evaluate a mean position of the squares of each line across a print media which is scanned. This gives a 'mean point', for each line of the printed pattern.

For each row of squares, there is a mean position denoted 'X'. An overall mean position line 200 can be determined from the mean points of each individual row of the pattern. In a perfectly aligned print system, the mean points would lie on the same vertical line relative to the print media. However, in practice, due to defects in the print system, the points may lie on a line which forms an angle to true vertical relative to the print media. The angle between the line of mean points and true vertical is equal to the skew angle. Once the skew angle is determined, this can be used to refine the evaluation of the angle theta zeta.

Referring to FIG. 5. herein, there is illustrated schematically basic process steps carried out by a prior art algorithm for determining the skew angle from a printed pattern of squares. In step 500, the mean position of each row of squares is evaluated. This gives the mean position of each row 501. In step 502, there is constructed a best fit line passing between the mean position of each row of squares. In step 501, there is determined an angle between this best fit line, and a true vertical line, which is taken as the skew angle 503.

However, the above method for determining skew angle proves to be poorly accurate when applied to mechanical printer devices. The theta zeta correction performance is lowered by the rough evaluation of the skew angle.

SUMMARY OF THE INVENTION

According to a first aspect of the present invention there is provided a method of determining an angle between a first direction of movement of a print head and a second direction of movement of a print media, said method comprising: printing an array of markings on said print media, said array of markings extending along said first direction and along said second direction; traversing a sensor device along said first direction, and detecting a signal corresponding to said plurality of markings; identifying a plurality of peaks in said sensor signal as a plurality of data co-ordinates; and obtaining an angle data describing an angle between said plurality of data co-ordinates and a reference data.

Other aspects of the invention are as recited in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF A SPECIFIC MODE FOR CARRYING OUT THE INVENTION

There will now be described by way of example a specific mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

When evaluating skew, by the prior art methodology described with reference to FIGS. 1 to 5 herein, the implicit assumption was made that the skew angle is a constant characteristic of a particular printer device. It was assumed that the print media moved on a constant axis, that is to say, not perfectly vertical, but along an axis of movement which does not vary during the movement of the print media through a print mechanism. Further, it was assumed that the axis of movement did not move between one movement of the print media and another.

However, the inventors have realised that the above prior art assumptions are proved to be wrong in practice.

The inventors have realised that a combination of various mechanical issues are present, which affects the automatic alignment process. These include;

- Skew between the print media and the print mechanism is very important.
- Variations of skew angle occur for different media types on the same printer device.
- Variations of skew angle occur for different media sizes on the same printer device.
- Variations of skew angle occur for the same media item when placed on different individual printer devices, due to variations between individual printer devices.
- Separation of the scan operation and the print movement leads to a wide amplitude displacement of the print media.
- In the printing application for printing the pattern, an entire page of print media is printed and then the print media is pulled back through the printer, before a scan operation commences. The print media may leave the printer device, be duplexed or have other operations performed on it before the scan process occurs.

The above problems raise the need for a better skew evaluation which can deal with the variations of skew during a movement of a print media retained on a printer device, and between two movements of print media where the print media leaves the printer device between printing of a test pattern and a scan operation.

Figure 1:
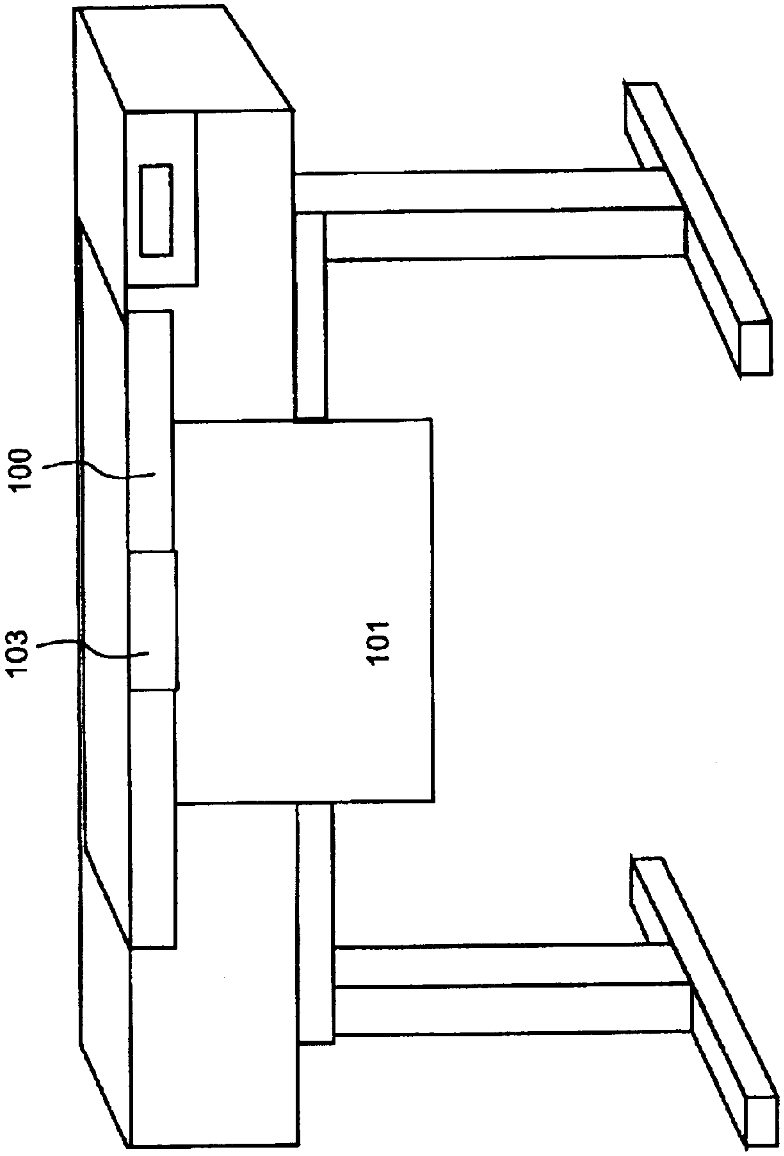
Fig. 1 (Prior Art)
FIG. 1 illustrates schematically a prior art printer device having a print head which moves on a carriage side to side across a print media in a direction transverse to a direction of movement of the print media through the printer device.
Figure 2:
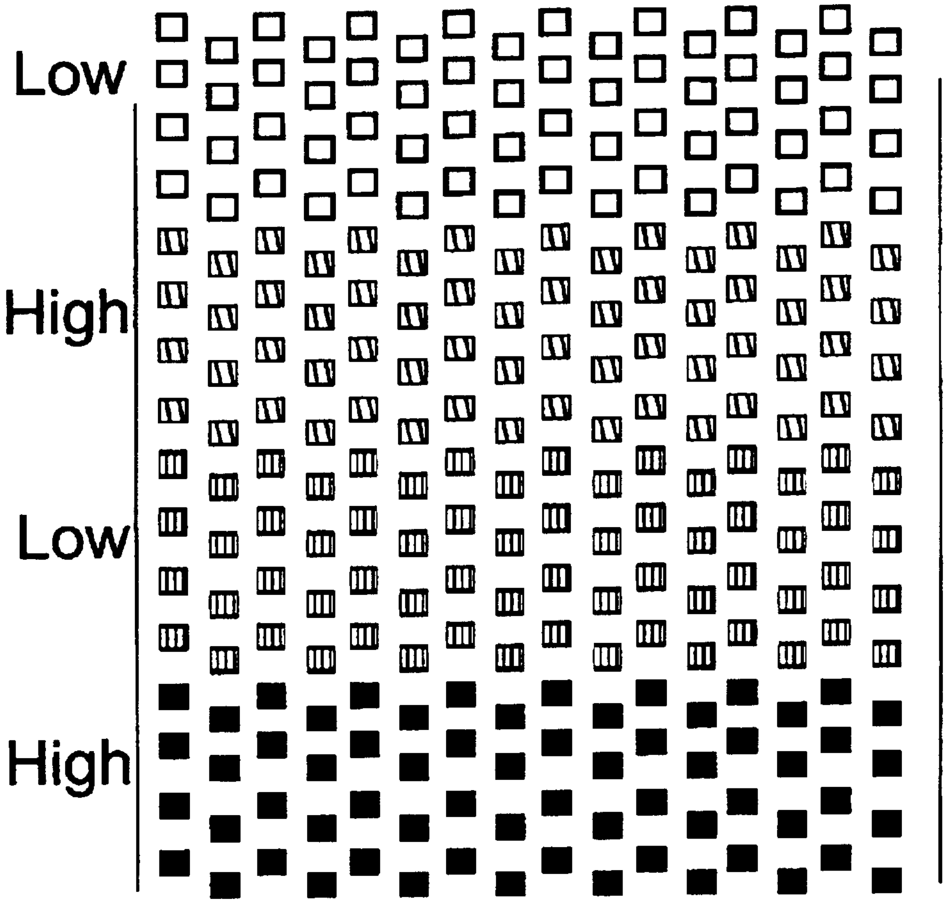
Fig. 2 (Prior Art)
FIG. 2 illustrates schematically a test pattern comprising an array of a plurality of ink squares printed onto a print media by the prior art printer device.
Figure 3:
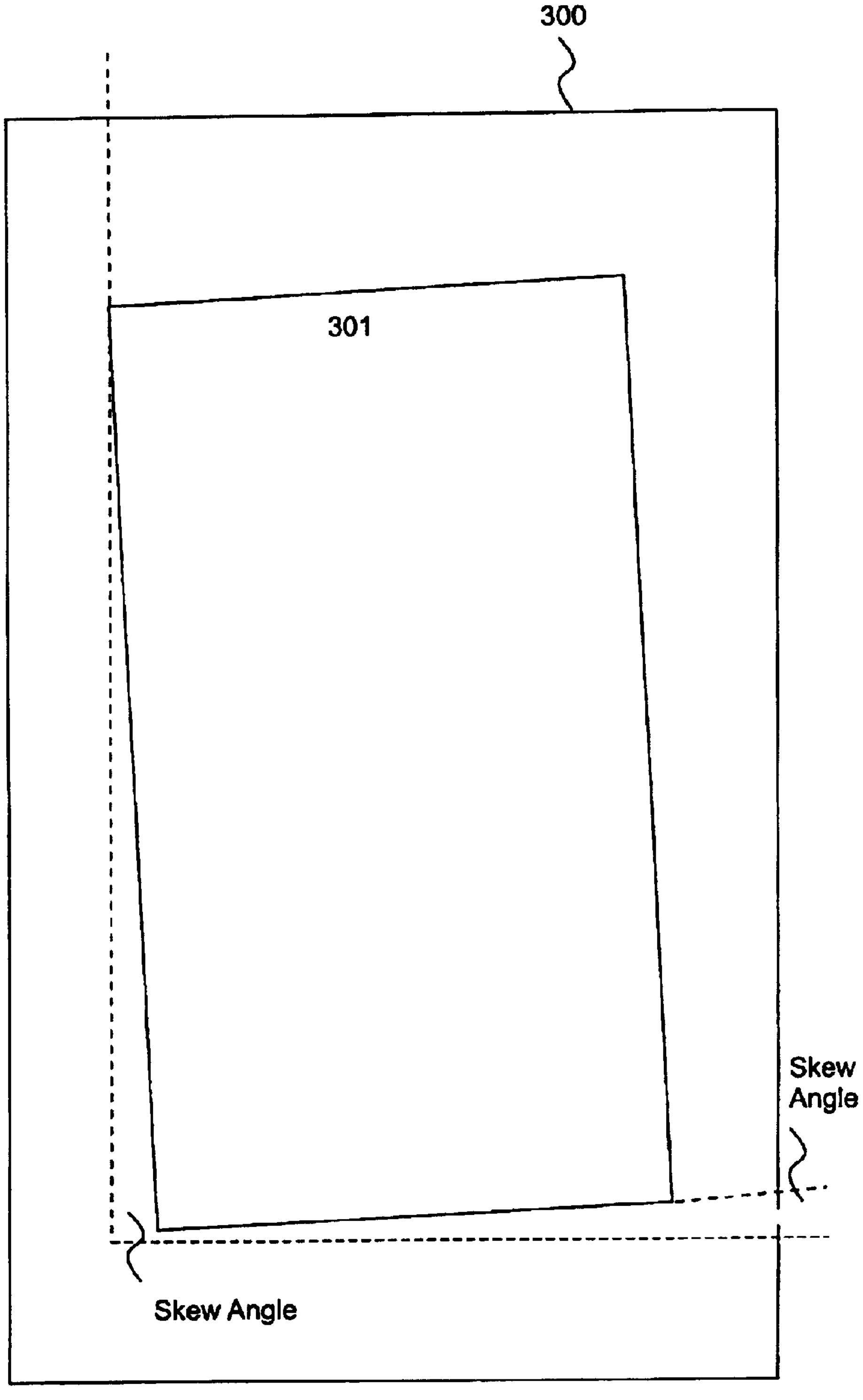
Fig. 3 (Prior Art)
FIG. 3 illustrates schematically an image printed onto a print media, illustrating a skew angle between a main length axis of the image and a main length axis of the print media.
Figure 4:
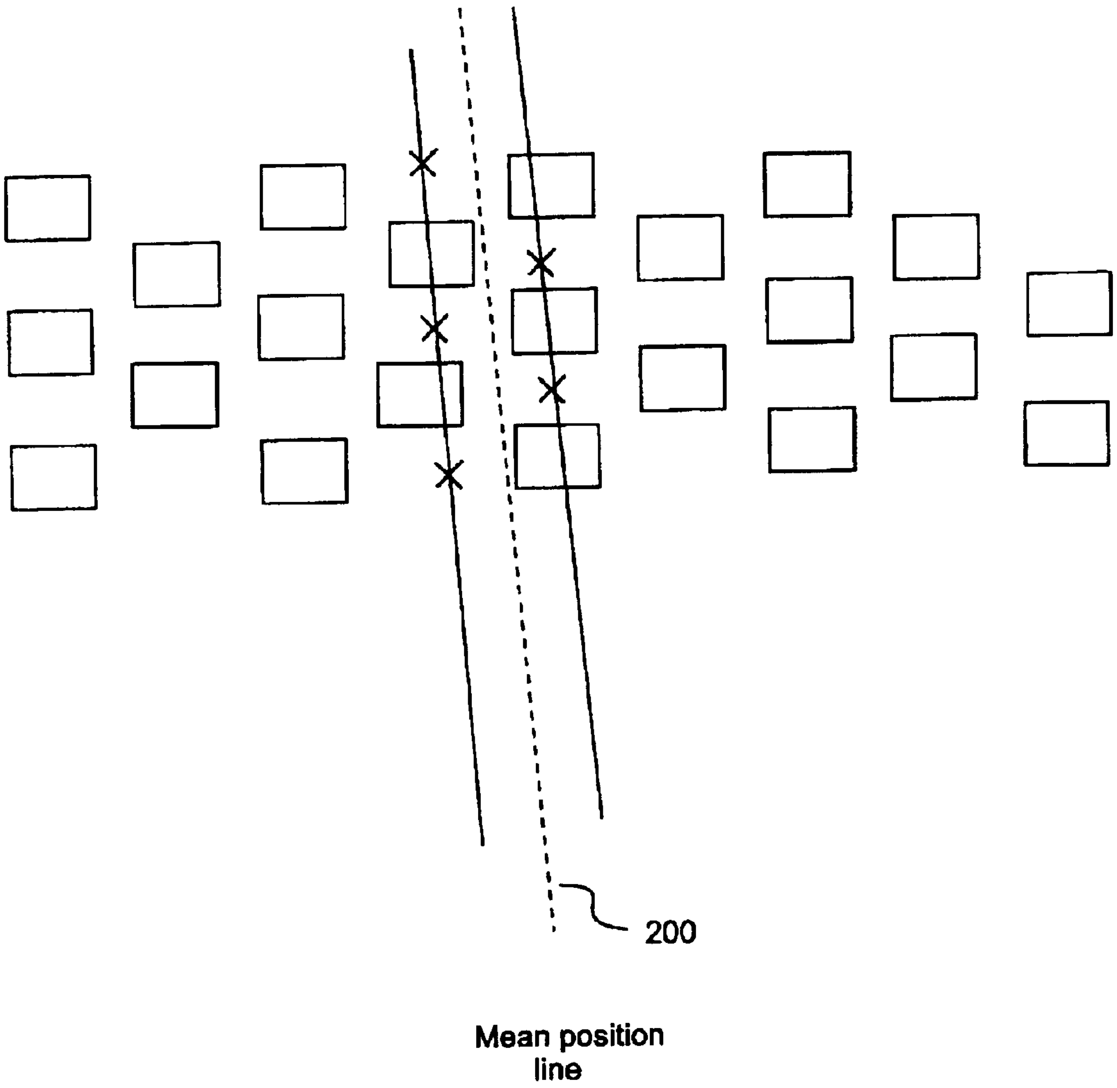
Fig. 4 (Prior Art)
FIG. 4 illustrates schematically a prior art method for determining a skew angle.
Figure 5:
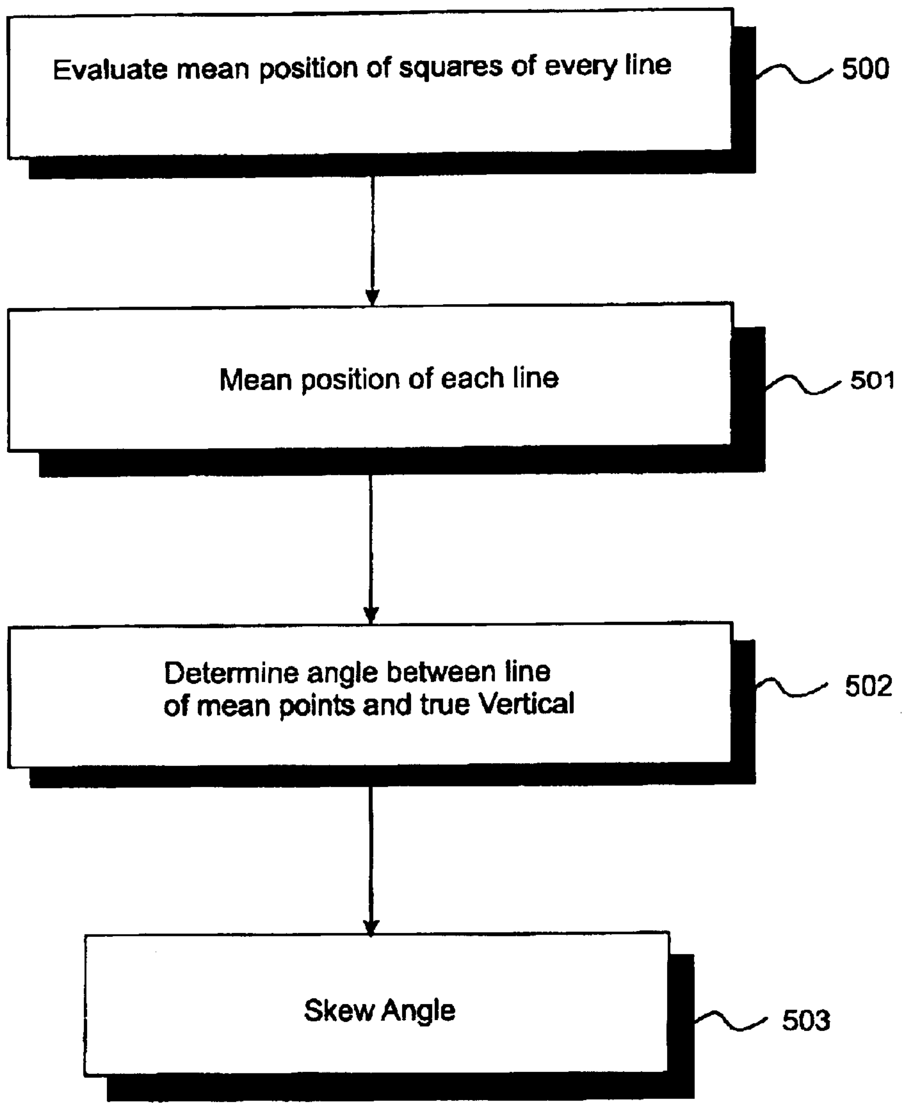
Fig. 5 (Prior Art)
FIG. 5 illustrates schematically process steps carried out by a prior art algorithm for determining skew angle.
Figure 6:
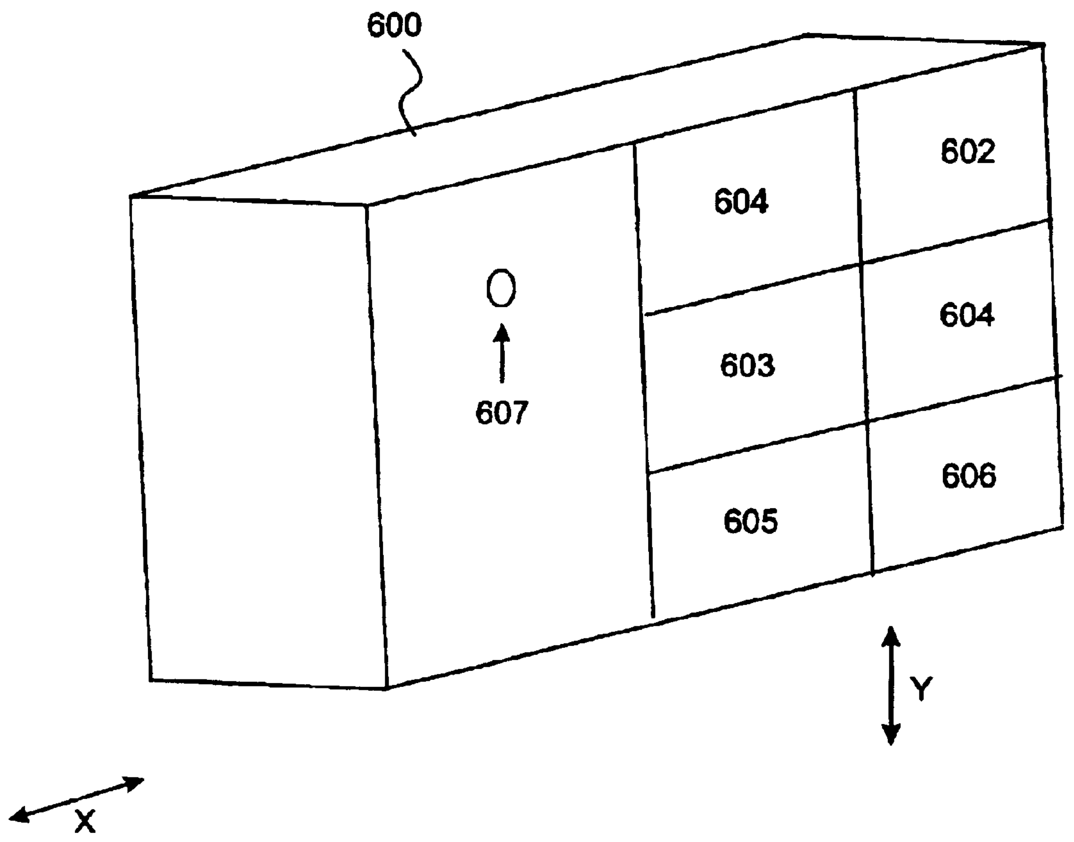
FIG. 6 illustrates schematically a carriage of a printer device comprising a plurality of printer heads.

Referring to FIG. 6 herein, there is illustrated schematically in perspective view, a carriage 600 of a printer device. The carriage comprises 6 individual printer heads 601–606, each printer head comprising a plurality of inkjet nozzles; and an optical sensor device 607. The optical sensor device is mounted rigidly within a casing of the carriage, and is in fixed spatial relationship with the print heads, and therefore in fixed spatial relationship to the inkjet nozzles. Each printer head has two columns of inkjet nozzles.

The carriage moves across the print media in a first direction X, and the print media moves in a second direction Y, which is transverse to the first direction. As the print media feeds forward, the carriage moves across the print media in a direction transverse to the direction of movement of the print media.

Figure 7:
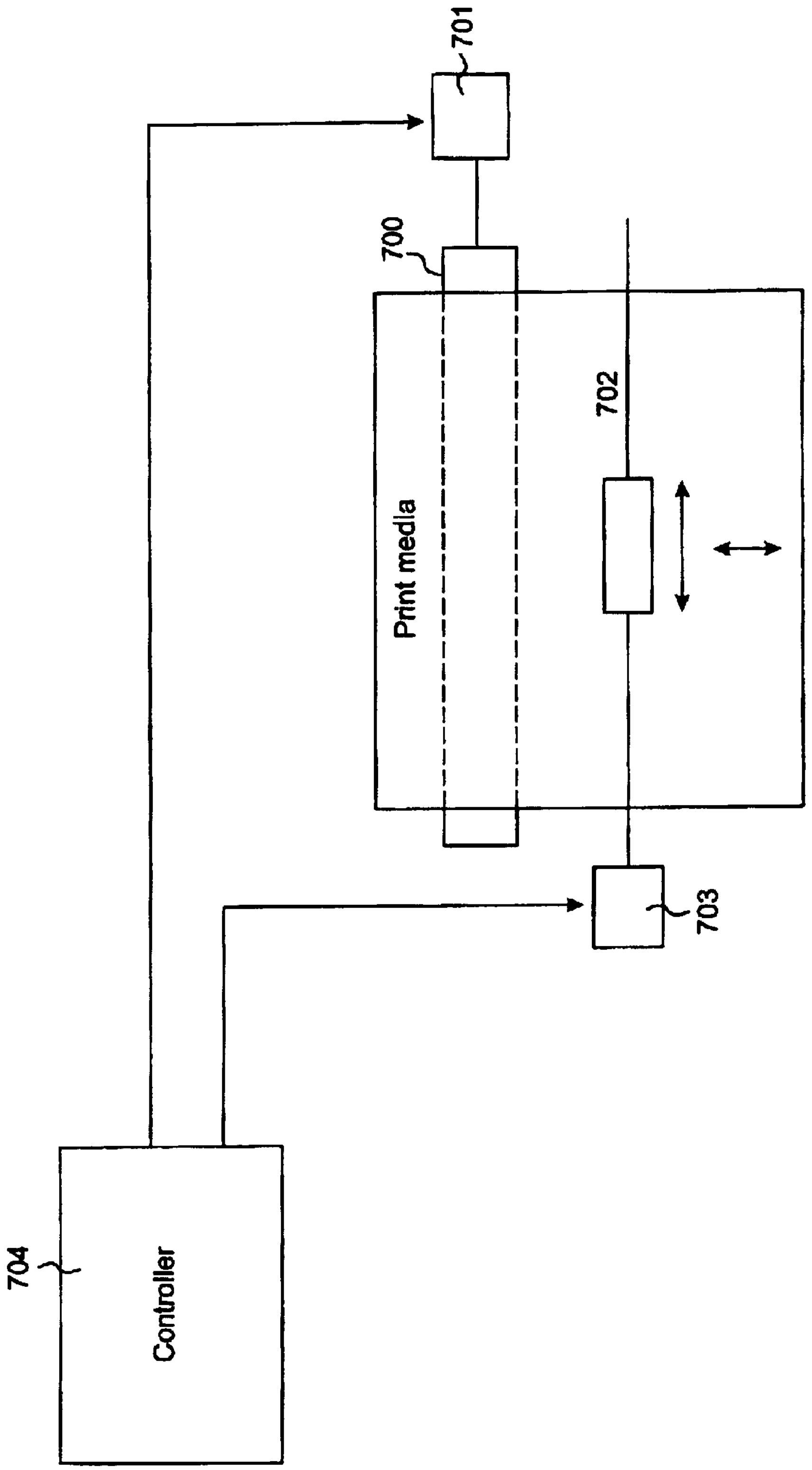
FIG. 7 illustrates schematically a control mechanism of a printer device, for controlling transport of a print media through the printer device, and for controlling transport of a plurality of print heads across the print media according to a specific implementation of the present invention.

Referring to FIG. 7 herein, there is illustrated schematically a control mechanism of the printer device for controlling passage of a print media through the printer device, and for controlling movement of a plurality of print heads across the print media. A media transport mechanism 700 for moving a print media in a second Y direction, comprises a set of rollers, driven by one or a plurality of servo motors 701. A carriage 702 which carries the print heads and sensor, is moveable on a carriage transport mechanism, driven by a second set of servo motors 703.

Both the media transport mechanism and the carriage transport mechanism are controlled by a controller device 704.

The controller device 704 applies an automatic alignment process to the print heads. The automatic alignment process is carried out by printing an array of marks, for example square ink spots, on the print media, and scanning the printed array of marks into memory, the marks being detected by the sensor mounted on the carriage; determining a skew angle from the printed marks, and determining a print head misalignment, after correcting for the skew angle. Once and angle of misalignment due to misalignment of the print head relative to the media transport mechanism is determined, corrections can be made to a stream of data to be printed, so that the printed image on the print media is correctly aligned.

Figure 8:
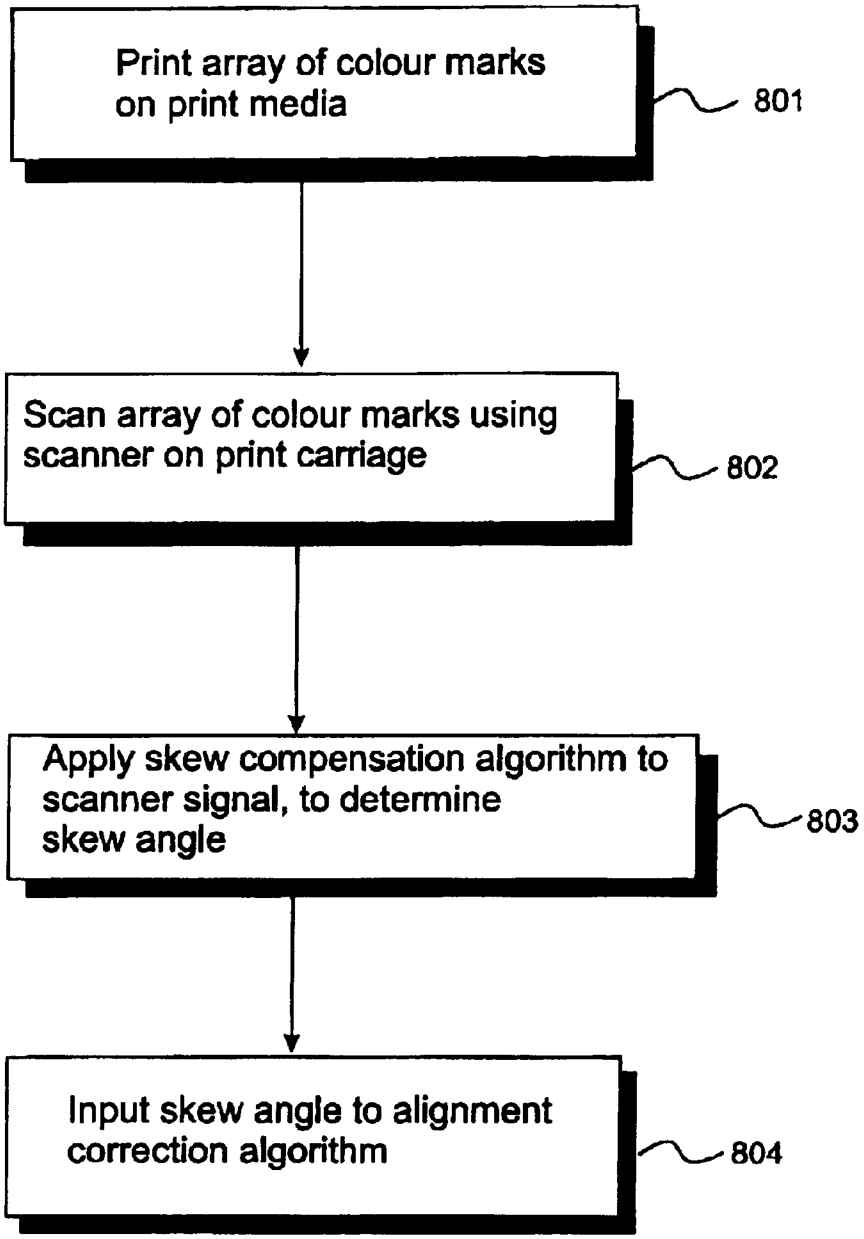
FIG. 8 illustrates schematically process steps carried out by a printer device for carrying out a print alignment compensation process according to a specific implementation of the present invention.

Referring to FIG. 8 herein, there is illustrated schematically process steps carried out by the printer device, for carrying out a print alignment compensation. In step 801, the carriage is driven for printing an array of colour marks onto the print media. The carriage traverses the print media in a direction nominally perpendicular to a direction of movement of the print media, producing an array of colour spots. Each print head having a different print colour, produces a plurality of ink spots. The ink spots may typically be square or rectangular, but the precise shape of the ink spots can be varied according to different implementations of the present invention. During printing of the array of ink spots, the print media is moved in a direction nominally perpendicular to a direction of movement of the print heads. The carriage may move across a width of the media, whereas the print media may be moved up and down in a direction nominally perpendicular to a direction of a main length of the print media. In fact, the nominally perpendicular angle may be not quite perpendicular due to a slight skew of the media sheet in the media transport mechanism.

In step 802, the array of colour marks are scanned using a sensor mounted on the printer carriage. The carriage moves along a row of ink spots, producing a sensor signal for that row of ink spots. The sensor signal is input into the controller, and converted into digital data. In step 803, a skew compensation algorithm is applying to the digitized sensor signal, in order to determine a skew angle from the sensor signal resulting from a nominally horizontal scan across a width of the print media. In step 804, the skew angle obtained as the result of process 803 is applied to an alignment correction algorithm which may comprise a prior art alignment correction algorithm.

Figure 9:
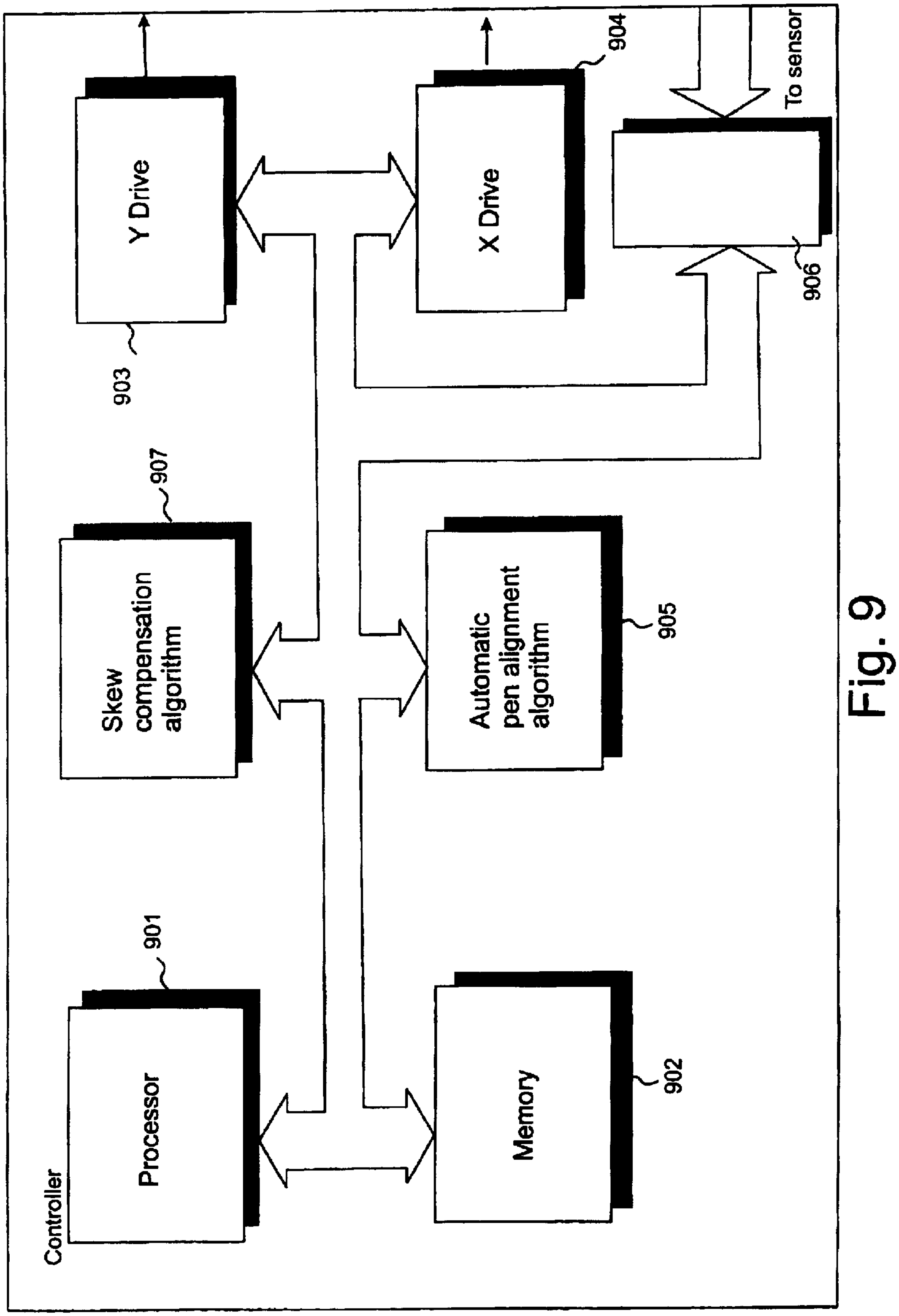
FIG. 9 illustrates schematically components of a controller device comprising the printer device.

Referring to FIG. 9 herein, there is illustrated schematically components of the controller device for controlling the media transport mechanism and carriage transport mechanism. In the best mode, the controller can be implemented as an application specific integrated circuit (ASIC). The controller 900 comprises a processor 901; an area of memory 902; a media transport mechanism driver 903; a carriage transport mechanism driver 904 for moving the carriage in the first X direction; an automatic pen alignment algorithm 905 for applying a calibration in order to compensate for alignment of the print heads and carriage relative to the media; a sensor interface 906 for inputting optical signals received from an optical sensor mounted on the carriage and converting the optical signals to digital format; and a skew compensation algorithm 907 for determining from the sensor input signals an angle of skew of the print heads relative to the media.

A method of operation of the printer device in order to apply an automatic pen alignment process will now be described, in which a skew angle is determined.

In this specification, by the term 'skew angle', it is meant an angle between a line of movement of a print head in a first direction X, and a line perpendicular to a line of movement of a print media in a second direction Y.

An array of colour square ink spots is printed in a square box pattern in rows and columns. Once printed, the array is scanned by a sensor device. A square box aligned in a scan axis is printed and scanned by a sensor which is provided on the same carriage to which the pen is mounted. An optimal scanning line would pass through the centre of each square ink spot, producing an output signal having regular peaks at the positions of the squares. If the signal produced has peaks with irregular amplitudes, this means that a media skew has been detected. By measuring how the amplitude of the peaks in the sensor signal is decreasing or increasing along the scan axis, the extent of the skew can be deduced, and can be compensated for when printing a print job.

According to the specific mode implementation described herein, the skew of a print media is evaluated locally using the results of a scan along each row of printed squares of a printed pattern comprising an array of squares.

Figure 10:
FIG. 10 illustrates schematically an array of color ink spot squares printed by a print head of a printer device, and illustrating a path of a sensor device traversing said printing color ink squares, in a case where there is little or no skew present.

Referring to FIG. 10. herein, there is illustrated schematically an array of squares printed by a print head. A first row of squares 1000 is coloured in a first colour for example blue, and a second row of squares 1001 is coloured in a second colour for example magenta. When a row of squares is scanned by a scanning head, a perfectly aligned movement of the sensor along the row of squares, would pass through the centres of the squares as shown by the arrow in FIG. 10.

Figure 11:
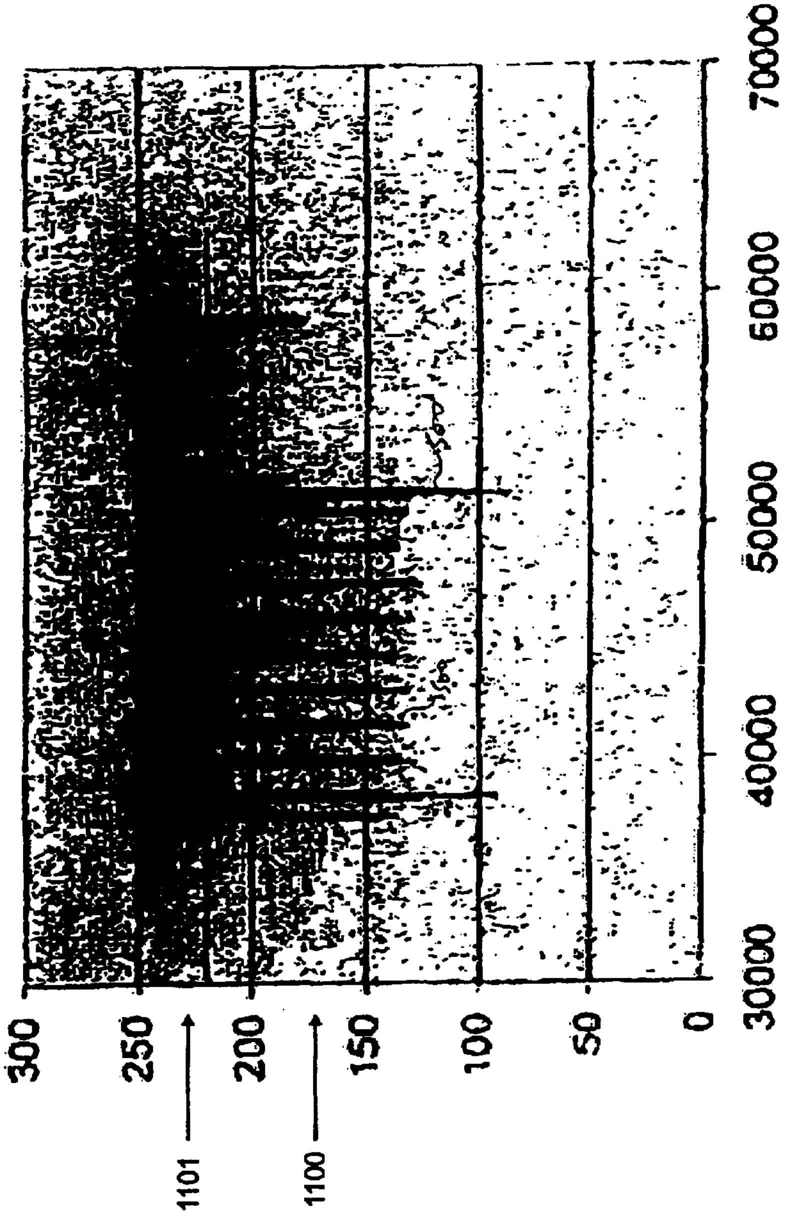
FIG. 11 illustrates schematically a sensor output signal produced by a sensor scan path across a plurality of color ink spots as shown in FIG. 10.

Referring to FIG. 11. Herein, there is illustrated one example of a plot of sensor amplitude output against horizontal position in the first direction X, resulting from a scan of the second line 1101 of the blue/magenta pattern illustrated in FIG. 10 herein. A first set of peaks 1100 having amplitude of a first value 150 or value exceeding 150, correspond to individual blue coloured squares along the second row 1001. The blue squares are far more detectable to the sensor, than the magenta coloured squares. It is possible to recognise individual vertical lines which have a high intensity and therefore produced higher peaks.

Between the first set of peaks produced by the blue colour squares, there are some lower amplitude peaks, typically of an amplitude not exceeding a second value 200, in the example shown, resulting from peripheral detection of the magenta coloured squares of the first row 1000. These correspond to squares of the adjacent row of the pattern which are detected by the sensor.

Where the pattern is being scanned in a true horizontal line, and the printing mechanism is accurately aligned with the print media, individual detection peaks 1100 corresponding to the squares of colour ink printed across a row tend to have a similar amplitude as each other. In the example show in FIG. 11, the peaks 1100 corresponding to the blue squares all have an approximately equal amplitude to each other, and the peaks 1101 corresponding to the magenta squares also have an approximately equal amplitude to each other, with the peaks 1100 corresponding to the first colour blue being stronger than the peaks 1101 corresponding to the second colour magenta.

Figure 12:
FIG. 12 illustrates schematically a second array of squares showing a second scanned path of a sensor device along a row color ink spot squares, where there is significant skew present between the scanned path and a row of said color ink spots squares.

However, where there is significant skew present, movement of the sensor scan is not as 'horizontal' as it should be relative to the pattern, as illustrated schematically in FIG. 12 herein. Where there is skew of the printed pattern relative to the direction of scan of the sensor, the line of scan does not coincide with the horizontal line of the printed squares. Across a scan movement, the sensor head moves between a first row 1200 of printed squares and a second row 1201 of printed squares, so that the sensor head tends to cross from the first row to the second or vice versa.

Under these circumstances, the sensor signal shows variation in the amplitudes of successive peaks for squares of a same colour.

Figure 13:
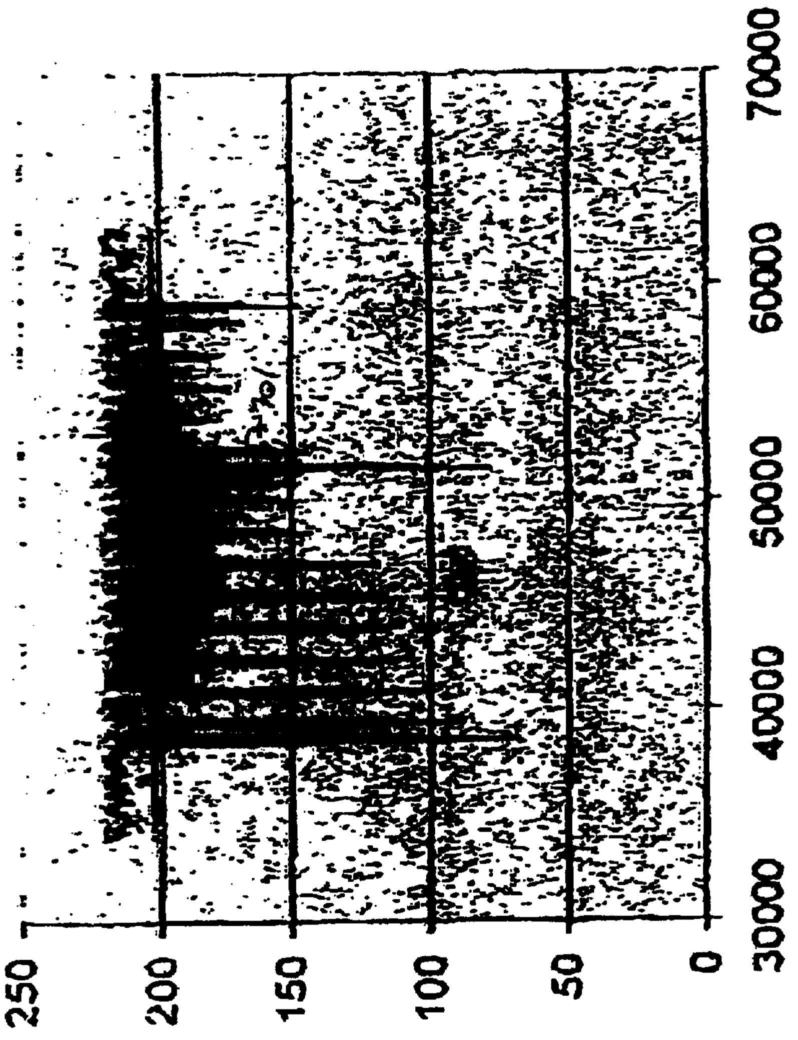
FIG. 13 illustrates schematically a sensor output signal produced by a sensor following a path as shown in FIG. 12 for detecting a row of color ink spot squares according to a specific implementation of the present invention.

Referring to FIG. 13 herein, there is illustrated schematically a plot of sensor output against horizontal distance for a scan across a pattern of squares, where the pattern is skewed relative to the direction of scan of the sensor. The impact of the skew on the sensor signal is clearly identifiable as a decline in peak amplitude of the sensor signal for squares of a signal color. An amplitude of sensor signal peaks which correspond to the boxes which are aimed to be scanned, in this case, the blue boxes on the first row 1200 diminish, with distance along the scan axis, as the line of scan deviates from the first row 1200 of squares as the scan head progresses further away from the first row of squares.

On the other hand, squares from the adjacent second row, in this case the row 1201 of magenta coloured squares, become more prominent and the sensor signal from the second row increases in intensity as the sensor moves positively in the scanned direction.

There is a correlation between the intensity of the sensor signal peaks and the skew angle.

At a local level, i.e. the level of each individual printer device, it is possible to determine if, and by how much, a particular scan is impacted by the skew. This information is then used locally in the printer device to correct the result of a scan and reduce the impact of the skew.

The intensity of the signal returned by the sensor, and consequently the peak amplitude of each spike corresponding to each color square, depends on the surface of the pattern which is being scanned. The bigger the pattern, the stronger the signal. This relationship holds true until the pattern reaches over an entire scanning zone of the sensor. The more pattern which the sensor can detect within its scanning zone, the higher the amplitude of the sensor signal.

Figure 14:
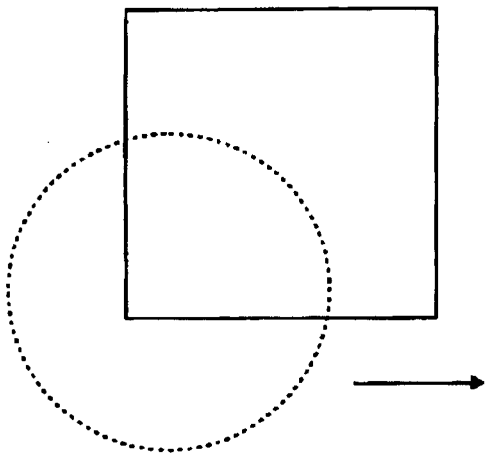
FIG. 14 illustrates schematically a detection zone of an optical sensor relative to a color ink spot square, where the sensor does not pass centrally over a mid line of the ink spot square.

Referring to FIG. 14 of the accompanying drawings, there is illustrated schematically a detection zone of a sensor, passing over a square of colour ink in a direction as shown arrowed. In this case, the overlap between the detection zone, shown as a −3 dB level, and the colour ink square is only partial, resulting in a relatively low amplitude sensor signal.

Figure 15:
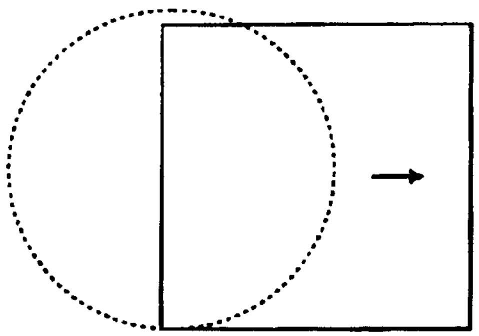
FIG. 15 illustrates schematically a detection zone of an optical sensor, where the optical sensor follows a path traversing approximately centrally across the ink spot square.

Referring to FIG. 15. herein, there is illustrated schematically a −3 dB level of a detection zone of a sensor, as it passes across a colour ink square in a direction arrowed, where an almost complete overlap of the detection zone and the colour square occurs. This gives rise to a relatively higher sensor signal, compared to a situation where there is a lower degree of overlap between the detection zone and the colour ink square.

In general, the amplitude of the signal produced by the sensor is dependant upon the amount of overlap between the sensor detection zone and the colour ink square which has been detected, with a higher amplitude being obtained for a higher amount of overlap, and a lower amplitude signal being obtained for a lower amount of overlap.

The surface of the pattern actually viewed within the detection zone of the sensor depends upon the respective positions of the scan axis of the sensor and the row axis of the pattern. Therefore there is a direct correlation between the evolution of the peak amplitude of the sensor output for a series of succesive detected color squares, and the relationship between the scan axis and the row axis. That is, there is a direct correlation between the peak amplitude height of the sensor output and the skew between the printed pattern and the scan axis of the printer's carriage.

To measure the skew, the following algorithm process steps are applied to the sensor signal resulting from the scanned in pattern.

1. The Cartesian coordinate position (X, Y) of the peak of each sensor signal is determined.
2. Maxima which correspond to the squares of the pattern of the same colour—width—density is retained. This enables maintaining coherence.
3. A linear regression is calculated of the selected points.
4. An angle between the line of linear regression and a true horizontal is determined. This angle is taken is being the angle of skew.

Figure 16:
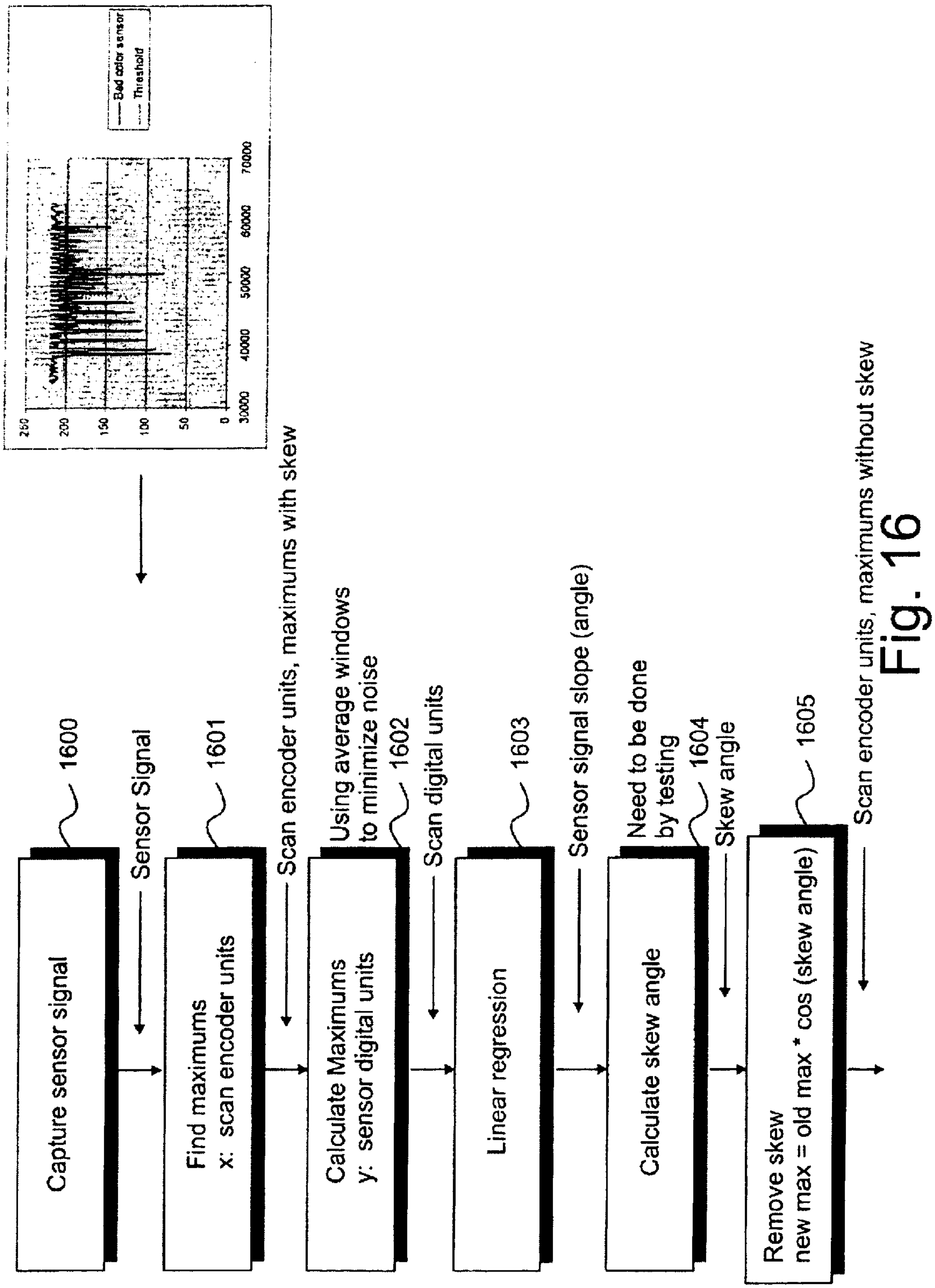
FIG. 16 illustrates schematically an overall process carried out by the printer device for scanning an array of printer ink squares, determining a skew angle, and correcting a sensor output for the effects of skew according to the specific implementation of the present invention.

Referring to FIG. 16 herein, there is illustrated schematically process steps carried out by the printer device for overall capture of a sensor signal, calculation of the skew angle, and removal of the skew. In process 1600, the sensor signal is captured by the sensor device. In process 1601, the maximums in the horizontal direction of the peaks in the sensor signal are located. In step 1602, the maximums of the peaks in the vertical direction are located. An average window is used in order to minimise noise on the sensor signal. The output of the processes 1601, 1602 is a digital sensor signal. In process 1603 a linear regression algorithm is applied to the located maximum X, Y positions resulting in a sensor signal slope angle. In process 1604, a skew angle is calculated. In process 1605, the skew can be removed from the sensor signal to give a true indication of the misalignment of the printer head relative to the print media.

Figure 17:
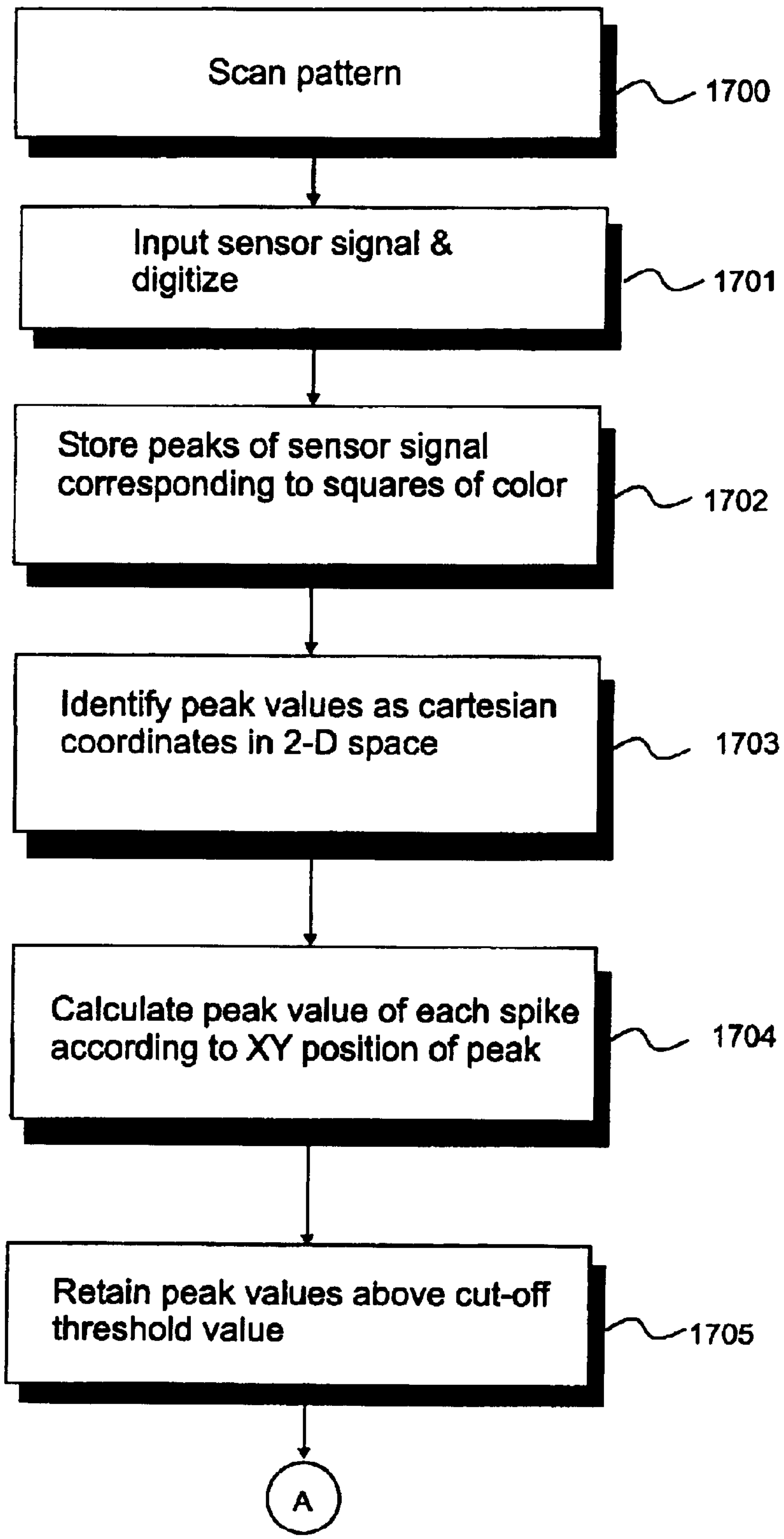
FIG. 17 and 18 illustrate schematically an algorithm for determining an angle of skew from an output sensor signal produced by the sensor traversing a row of ink spots printed on the print media, according to a specific implementation of the present invention.
Figure 18:
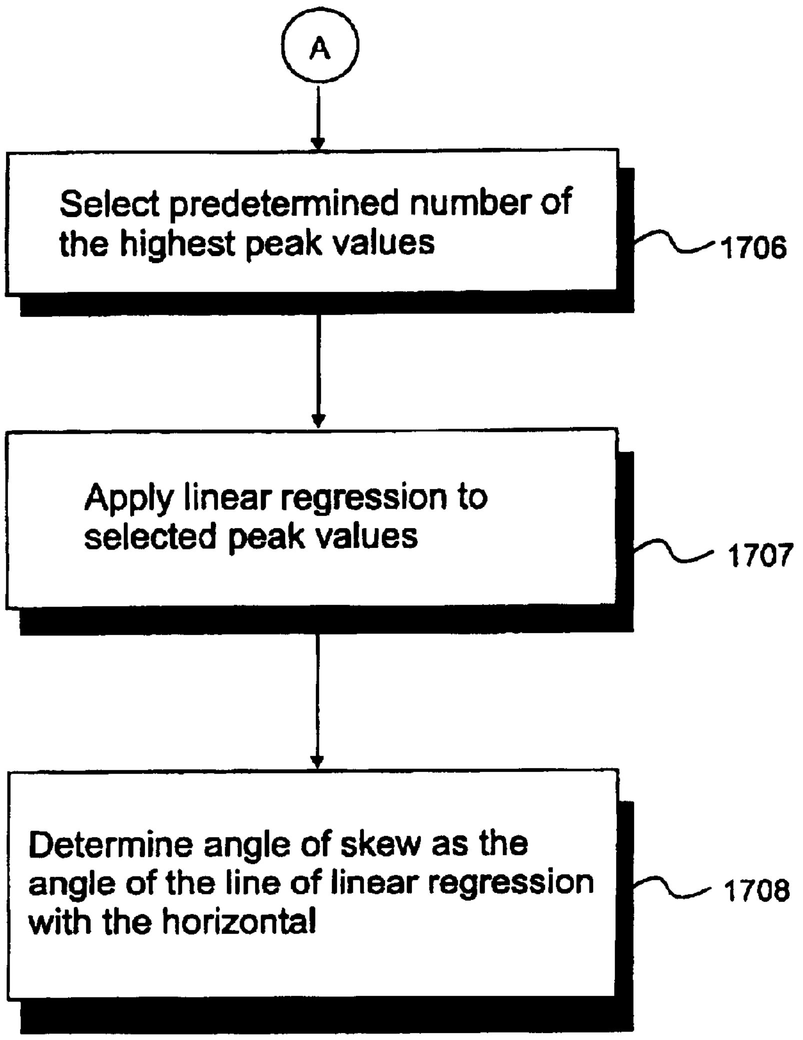

Referring to FIG. 17 herein, there is illustrated schematically process steps carried out by processor 901 and memory 902 under control of the skew compensation algorithm 907 for determining a skew angle data describing an angle of skew between a line of movement of a print media, relative to a line perpendicular to a line of movement of a print head.

In step 1700, a row of a printed pattern of an array of ink is scanned by a sensor device mounted on a carriage which also carries a plurality of ink check nozzles which were used to print the array of ink spots. A sensor signal is generated as an electrical signal having an amplitude value proportional to an intensity of detected light. The sensor signal is digitised and input into a digital controller device as described with reference to FIG. 9 herein in step 170, as an ongoing continuing process carried out in real time as the sensor passes over a row of ink color spots. Since the velocity of the carriage relative to the print media is approximately constant, the sensor signal comprises a set of peaks of amplitude recurring at approximately regular time intervals. In step 1702, the sensor signal is stored in digital memory device 902. In step 1703, peak values of the sensor signal are identified in 2 dimensional space, and are stored as peak data values in 2 dimensional Cartesian co-ordinates. In step 1704 the maximum value of each peak is determined according to the position in 2 dimensional space (X, Y position) of the maxima of each peak. In step 1705 the maximum peak values are compared with a threshold value which is pre-set. Any maximum values of peaks which do not exceed the threshold value are ignored. Remaining maximum peak values which exceed the threshold value are retained and are used as a basis for evaluating an angle of skew, relative to the threshold value. The threshold value is set to be a constant value. In step 1706, a pre-determined number of the maximum peak values is selected. The pre-determined number of peak values selected are the highest maximum peak values from the set of peak values which exceeded the pre-determined threshold level. In step 1607 1707 a linear regression algorithm is applied to the selected peak values, in order to determine a best fit of a straight line to selected set of maximum peak values. The straight line fit can be expressed in 2 dimensional space by the formula y=mx+b, where x is a horizontal axis, y is a vertical axis, m is the gradient of the line relative to the horizontal axis, and b is the intercept on the vertical axis.

The angle Ψ between two lines having slopes $m_1$and $m_2$ can be determined from the equation:

$$\tan \Psi = m_2 - m_1/(1+m_1 m_2)$$

Lines are parallel or coincident if and only if $m_1=m_2$. The angle Ψ is the skew angle between the line having gradient $m_2$, as determined from the maximum peaks of the selected set of peaks generated from the sensor signal, and a nominal horizontal axis having gradient zero ($m_1=0$).

The skew determining algorithm illustrated with reference to FIG. 17 may be repeated for each row of ink spot squares detected, and an average skew angle of the media may be determined by averaging the skew angle output for a plurality of different rows of detected ink spot squares.

The algorithm illustrated with reference to FIG. 17 herein may be loaded into the memory of the printer device from a data storage media, wherein the data storage media contains program data for implementing an algorithm for determining an angle between a line of movement of a printer head of a printer device, and a line transverse to a line of movement of a media sheet transported in said printer device, from a digitised optical sensor signal, said optical sensor signal comprising a plurality of peaks spaced apart at substantially regular spatial intervals, said algorithm carrying out the processes of: identifying maximum peak values for each of said plurality of peaks; comparing said set of identified maximum peak values with a pre-determined threshold value; selecting a set of said peak values which exceed said pre-determined threshold value; and determining said angle by analysing a spatial positioning of said plurality of peaks.

What is claimed is:

1. A method of determining an angle between a first direction of movement of a print head and a second direction of movement of a print media which is skewed with respect to a predetermined intended direction of movement of the print media, said method comprising:

printing an array of markings on said print media, said array of markings extending along said first direction and along said second direction;

traversing a sensor device along said first direction, and detecting a signal corresponding to said plurality of markings;

identifying a plurality of peaks in said sensor signal as a plurality of two-dimensional data co-ordinates; and obtaining angle data representing an angle between said plurality of two-dimensional data co-ordinates and a reference data and which is indicative of skew between the second direction of movement with respect to the predetermined intended direction of movement.

2. The method as claimed in claim 1, wherein said process of obtaining an angle data comprises:

identifying a trend line in said plurality of data co-ordinates;

comparing said trend line with a reference data line; and obtaining an angle data describing an angle between said trend line and said reference data line.

3. The method as claimed in claim 1, wherein said reference data comprises a data corresponding to a constant sensor signal.

4. The method as claimed in claim 1, wherein said sensor signal comprises a plurality of amplitude peaks, each said amplitude peak corresponding to a detected said marking.

5. The method as claimed in claim 1, where said plurality of peaks are spaced apart from each other at regular intervals.

6. The method as claimed in claim 1, comprising: ignoring peaks which are of a magnitude below a pre-determined level.

7. The method as claimed as claim 1, wherein detecting a signal comprises detecting an optical sensor signal.

8. The method as claimed in claim 1, comprising determining a trend line by:

identifying a maximum value of each of said plurality of peaks; and applying a mathematical line fitting technique to said plurality of maximum values to obtain an equation representing said trend line.

9. The method as claimed in claim 1, comprising determining a trend line by:

identifying a maximum value of each of said plurality of peaks;

applying a regressive line filling technique to said plurality of maximum values to obtain an equation representing said trend line.

10. An algorithm for determining a skew of a print media sheet in a printing device as indicated by an angle between a line of movement of a printer head of a printer device, and a line transverse to a line of movement of the print media sheet transported in said printer device, from a digitised optical sensor signal, said optical sensor signal comprising a plurality of peaks spaced apart at substantially regular spatial intervals, said algorithm carrying out the processes of:

identifying maximum peak values for each of said plurality of peaks;

comparing said set of identified maximum peak values with a pre-determined threshold value;

selecting a set of said peak values which exceed said pre-determined threshold value; and determining said angle and the skew of the print media sheet in the printing device by analysing a two-dimensional spatial positioning of said plurality of peaks.

11. The algorithm as claimed in claim 10, wherein said process of analysing a two dimensional spatial positioning of said plurality of peaks comprises:

fitting a straight line equation to said set of selected peak values; and determining an angle data corresponding to an angle between said fitted straight line and a line of zero gradient.

12. A printer device comprising:

a media transport mechanism for carrying a sheet of media;

a carriage transport mechanism capable of moving a carriage relative to a sheet of print media, said carriage comprising a plurality of ink pens, and an optical sensor;

a controller device for controlling said carriage transport mechanism and said media transport mechanism, said controller device operable for, driving said carriage for printing an array of ink spots onto the sheet of print media loaded onto said media transport mechanism;

controlling said carriage to move across at least one row of said printed ink spots, such that said sensor device generates a sensor output signal resulting from detection of said row of ink spots; such that said output sensor signal comprises a plurality of amplitude peaks each corresponding to a respective detected ink spot; and said controller device further comprising an algorithm operable for determining from the two dimensional positions of said plurality of peaks, an angle between a line formed by said plurality of peaks and a reference line, said angle representing an angle of skew of the sheet of print media relative to said carriage.

13. The printer device as claimed in claim 12, further comprising:

an automatic pen alignment algorithm for carrying out an automatic pen alignment process in which a calibration is carried out to compensate for a pen variability, wherein said angle of skew is input into said automatic pen alignment algorithm.

14. A data storage media containing program data for implementing an algorithm for determining a skew of a print media sheet in a printing device as indicated by an angle between a line of movement of a printer head of a printer device, and a line transverse to a line of movement of a media sheet transported in said printer device, from a digitised optical sensor signal, said optical sensor signal comprising a plurality of peaks spaced apart at substantially regular spatial intervals, said algorithm configured for carrying out the processes of:

identifying maximum peak values for each of said plurality of peaks;

comparing said set of identified maximum peak values with a pre-determined threshold value;

selecting a set of said peak values which exceed said pre-determined threshold value; and determining said angle and the skew of the print media sheet in the printing device by analysing a two dimensional spatial positioning of said plurality of peaks.

* * * * *